April 11, 1961  J. A. WILSON, JR  2,979,326
PNEUMATIC SUSPENSION SYSTEM AND LIQUID
EXPULSION VALVE UNIT THEREFOR
Filed Feb. 25, 1957  2 Sheets-Sheet 1

INVENTOR.
JESSE A. WILSON, JR.
BY
Philip H. Sheridan
ATTORNEY

April 11, 1961

J. A. WILSON, JR 2,979,326

PNEUMATIC SUSPENSION SYSTEM AND LIQUID
EXPULSION VALVE UNIT THEREFOR

Filed Feb. 25, 1957

INVENTOR.
JESSE A. WILSON, JR.
BY
Philip H. Sheridan
ATTORNEY

United States Patent Office 2,979,326
Patented Apr. 11, 1961

2,979,326
PNEUMATIC SUSPENSION SYSTEM AND LIQUID EXPULSION VALVE UNIT THEREFOR

Jesse A. Wilson, Jr., Littleton, Colo., assignor to C. A. Norgren Co., Englewood, Colo., a corporation of Colorado Filed Feb. 25, 1957, Ser. No. 642,172

15 Claims. (Cl. 267—65)

This invention relates to a liquid expulsion valve assembly particularly designed to form a part of a pneumatic suspension system. Essentially the system comprises a bag filled with compressed air or other medium bearing moisture for supporting a load exposed to shocks and impacts and includes valve assembly means to prevent interference of the load carrying or shock absorbing characteristics of the air bag as a result of any water accumulation therein.

As an example, the invention may be utilized in connection with a vehicle to replace the standard type of steel leaf or spiral coil springs and thus for absorbing shocks primarily occasioned by travel over rough terrain and irregularities in the roads. Of course, pneumatic suspension apparatus employing resilient or elastic members in the form of a bellows or an air bag and containing a volume of compressed air or the like are well known. However, since the practicalness of utilizing a dry air or dry gaseous medium is very slight, the medium, such as compressed air, which fills the bag or suspension chamber generally carries moisture. Over a period of time of use of such a system incorporating compressed air or the like as the medium, it has been found as a result of several factors which will be mentioned hereinafter that liquid accumulates in the bag which, if not prevented or removed from the air bag, interferes with the shock absorbing characteristics thereof. Furthermore, just like any other inflated body, periodic refilling to maintain the desired pressure is required and since the available sources of the medium promote the liquid accumulation, the problem of water or liquid accumulation in the bag is a continual one.

It is thus an object of this invention to provide a pneumatic suspension system wherein the foregoing problem is eliminated.

It is also one of the primary objects of the invention to provide pneumatic suspension apparatus comprising a flexible bag containing compressed air or the like and having incorporated therein a liquid expulsion valve assembly which functions to remove and expel automatically, and without expelling air, any liquid that accumulates within the air bag.

A further object is to provide an apparatus as described in the preceding paragraph which functions to maintain and insure uniform operation of the air bag, to reduce the moisture carried in the air or other medium and thus in effect dry the air, and to prevent rusting of any metallic parts of the apparatus.

Another object of this invention is to provide a novel liquid expulsion valve assembly particularly designed for use in connection with pneumatic suspension apparatus although the assembly may be used in combination with various chambers, wherein compressed air or the like is exposed to sudden pressure changes, to expel liquid without expelling air.

A still further object is to provide a water expulsion valve assembly constructed to insure that substantially all liquid accumulated within the air bag will be discharged therefrom without loss of bag air pressure and in a chamber thereof which is separated from the air bag proper during liquid discharge.

Yet another object of the invention resides in providing a pneumatic suspension system of the type described wherein liquid accumulated will only be discharged during the application of instantaneous impacts to the system.

Other objects and advantages of the invention will become apparent upon considering the detailed description in conjunction with the drawings wherein like numerals represent similar parts throughout, wherein a preferred embodiment is illustrated, and wherein.

As indicated, the essence of this invention resides in a water or liquid expulsion valve assembly forming a part of a pneumatic suspension apparatus or system, together with the construction and function of the water expulsion valve assembly per se. However, it will be apparent that the assembly may be used in other combinations to remove undesirable liquid, such as in air tool lines and pneumatic cylinder piston combinations. For purposes of illustration only, Figure 1 exemplifies the suspension means as replacing the springs in an automobile for supporting a vehicle chassis relative to a front wheel whereby shocks or impacts due to road irregularities are absorbed by the suspension means. Of course, such is not to be so limited and may be used generally as an elastic or flexible load carrying or shock absorbing medium. Furthermore, reference hereinafter in the specification and claims will be made to "air bag," "water expulsion" and "compressed air," but it is to be understood that various gaseous media that bear or carry moisture condensable into liquid as distinguished from dry air or dry nitrogen are intended to be included.

Figure 1:
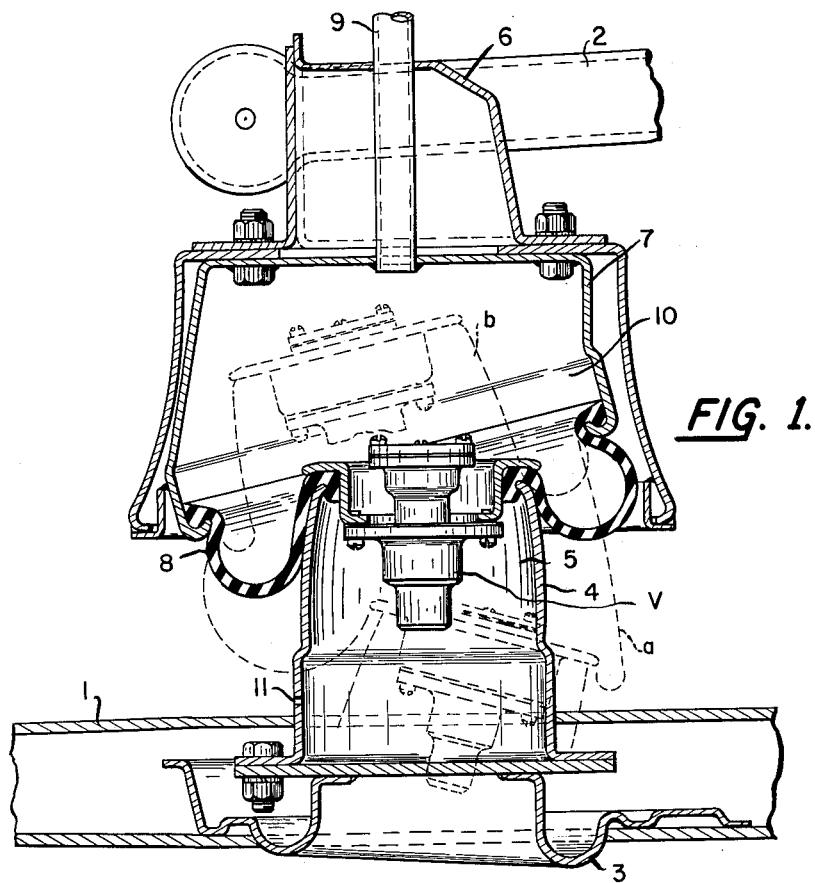
Figure 1 is a sectional diagrammatic view of the pneumatic suspension apparatus of this invention.

In Fig. 1 the lower pivot support which is attached to the vehicle chassis is shown at 1 and 2 represents the upper pivot support for a front wheel. Associated with framework or support 1 is a conventional structure 3 which may assume various forms and, as shown, provides a support for the upstanding hollow circular bracket 4 which forms a space or pocket 5. Structure 6, which also may take various forms, includes means enclosing and for supporting the inverted U-shaped member 7 and, of course, all of the supports, framework and brackets are preferably made of a suitable metal. In accordance with present day vehicle design, the structure 6 would be integral with the vehicle body and in operation over rough terrain and the like, means is provided between structure 6 and support 1 for absorbing shocks and impacts. When such occurs, with the illustration made, supports 1 and 2 and structure 6 move relative to one another, although for the purposes of this invention structure 6 and support 2 could be made integral and stationary with respect to one another with structure 6 and bracket 4 arranged for movement relative to one another during the absorbing of shocks.

The tips of bracket 4 and member 7 have bonded thereto by means well known, resilient and flexible mediums 8 such as rubber or neoprene, although synthetics or plastics may be utilized therefor. It will be seen that member 7 and mediums 8 form portions of an air bag, spring or chamber 10 and to complete the air bag there is also bonded to the rubber 8, in a manner that will be described hereinafter, a valve assembly generally represented by the letter V. It will be understood that air bag 10 may assume different constructions as long as it is sufficient to support the static load, such as that of a vehicle, as well as varying loads caused by travel over rough terrain. Furthermore, assuming valve unit V were eliminated from Figure 1, no claim whatsoever would be made to the remaining structure of Figure 1, such structure being merely illustrative of various suspension apparatuses that could be employed in combination with assembly V.

Of course, the air bag 10 is fluid sealed except for the compressed air inlet 9, the latter in turn being connected to an accessible valve similar to that of an ordinary automobile tire or, preferably, to a compressor including a control system therefor built into the vehicle body and the control system may be automatic to maintain a desired supply of compressed air within chamber 10. Let us assume that the static load of the vehicle requires a supply of compressed air within the bag 10 at a pressure within the range of 90 to 110 p.s.i., this being entirely selective. Thus, the source of compressed air (that at gas stations or the built in compressor) will deliver to bag 10 a volume of compressed air at a pressure within the range stated. Naturally, to maintain this pressure of the air within the range, as is true in connection with a conventional tire, periodic refilling and replenishing is required.

Let it be further assumed that an increase in external load on the air bag assembly 10 will increase the internal pressure within the air bag assembly to a maximum of 200 p.s.i. or, conversely, when the air bag is caused to expand any decrease in external load thereon will decrease the internal pressure to a minimum of 60 p.s.i. In other words, referring to Figure 1, it is to be assumed that the load when the air pocket 10 is positioned as shown in solid lines results in the air being at a pressure within the range of 90 to 110 p.s.i. The extreme position of the air bag shown in dotted lines at "a" occurs when the decrease in external load on the air bag decreases the internal pressure to 60 p.s.i. and during this change of position of the air bag the air therein will expand. The showing represented by dotted line "b" represents the other extreme, namely when the load increases the internal pressure within the air bag assembly to a maximum of 200 p.s.i. and, of course, during this positioning of the air pocket or bag 10 the volume of air therein will be compressed. These maximum and minimum air pressures are merely determinations of extreme expected operations during travel of the vehicle over various terrain and occasioned for the most part by instantaneous impacts and they are in no way to be construed as limitations of the invention. Assuming water has accumulated within bag 10 and bearing in mind that water is incompressible, it will be apparent that any substantial accumulation thereof will interfere with the desired shock absorbing characteristics of the suspension apparatus and the purpose of valve assembly V is to overcome this by expelling water without expelling air and without loss of bag air pressure.

To utilize dry air or a dry gaseous medium to fill bag 10 is not practical for numerous reasons such as the expense of extra equipment to maintain the air dry, the fact that the sources thereof are not generally available and finally dry air would be no more practical as a medium for bag 10 than it would be for an automobile tire. Thus, considerations dictate that the air or medium used will carry moisture and the air supply must be replenished periodically, primarily due to changes in temperature and unavoidable leakage, just as in the case of a tire, through inlet 9 to maintain the selected pressure under static load. In considering how water is apt to accumulate in chamber 10 or in chambers of other arrangements where the assembly V may be employed such as an air tool line and pneumatic cylinder-piston combinations generally, there are many factors involved and only the principal ones will be mentioned. In this connection it should be kept in mind that air chamber 10 is relatively small compared to the air space within a vehicle tire and thus to maintain uniform operation of air spring 10 and prevent interferences of the shock absorbing characteristics thereof the water has to be removed. One source of liquid accumulation which varies on different climatic conditions, is due to liquid or water from the compressed air system or supply dropping directly into bag 10 from the supply tubes. Secondly, particularly in cold and humid climates, water will form from condensation directly on the inside surface of the bag. Thirdly, the continued changes in pressure within the chamber 10 due to vibrations could result in some liquid condensation. In any event, it has been found that water accumulates in bag 10 and, due to air replenishing requirements, is a continual problem. Valve V not only removes this water accumulation but, for reasons that will be explained, has the effect of continually drying air within bag 10 by a positive action on the air.

Figure 2:
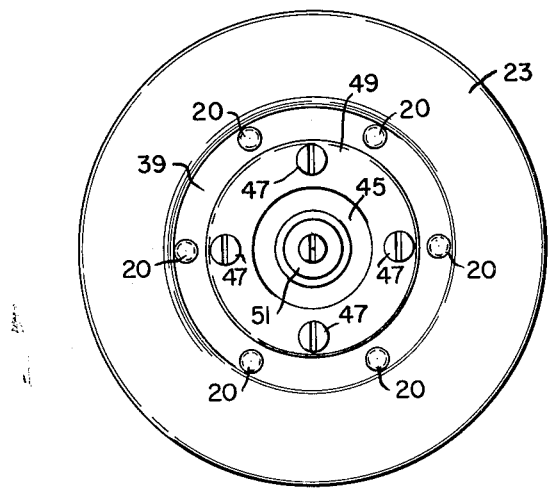
Figure 2 is an enlarged top view of the water expulsion valve assembly.
Figure 3:
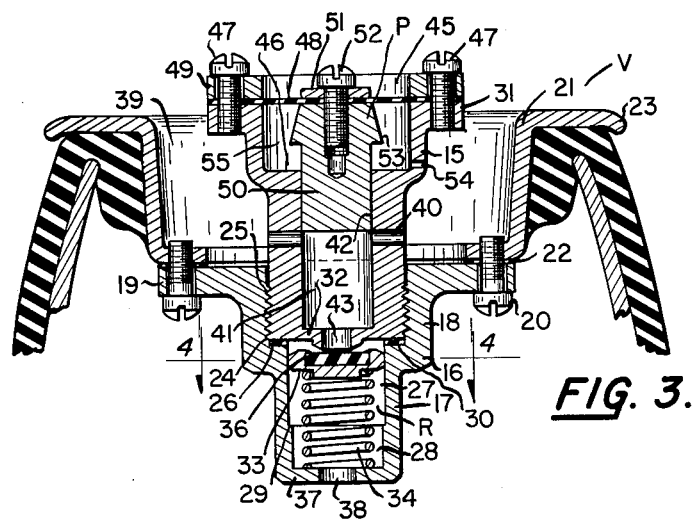
Figure 3 is an enlarged vertical sectional view of the valve assembly and a portion of the suspension apparatus, said view being taken on any straight plane passing through the center of the assembly.
Figure 4:
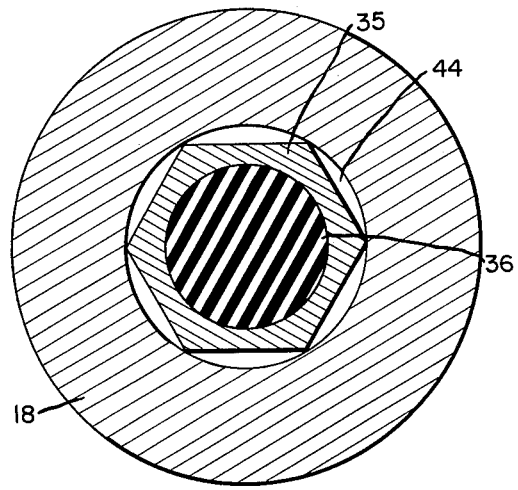
Figure 4 is a sectional view taken along the lines 4—4 of Figure 3.

Referring to Figures 2, 3 and 4 in particular, the details of the water expulsion valve assembly V are shown and unless specifically otherwise mentioned all of the parts are preferably metallic. This assembly includes an inner body 15 and an outer body 16 and within the outer body there is provided a relief valve generally represented at R and within the inner body 15 there is provided a diaphragm piston assembly generally represented by P. The outer body 16, as illustrated, has a lower cylindrical portion 17 which diverges at its upper end into an enlarged cylindrical portion 18 from which flares outwardly at the top thereof a circular flange 19. Integrally connected to flange 19 by any suitable means, such as a plurality of screws 20, is an open bottomed cup portion 21 and it is to be noted that the connection between the cup portion 21 and the flange 19 is provided with a circular gasket 22 which functions as a fluid seal. At its top the cup portion 21 flares outwardly in the form of an annulus 23 which together with the exterior vertical wall of cup 21 forms a surface to which the flexible bag material 8 is suitably bonded. The lower portion of body 15 is detachably secured within a first bore 24 of portion 18 and this connection may take the form of engaging screw threads 25 and should include an annular gasket 26 to form a fluid seal. Bore 24 communicates with a reduced bore 27 which in turn communicates with a further reduced bore 28, each of the reduced bores forming flanges or shoulders as shown at 29 and 30, the latter providing a seat for the gasket 26.

Inner body 15 terminates at one end thereof in annular flange 31 and at its other end in a depending part 32 which forms a seat for the relief valve R, the latter including a valve assembly 33 which is normally biased into engagement with seat 32 by spring means 34. The assembly 33, as shown in Figure 4, consists of a hexagonal shaped disc holder 35 which contains a rubber disc 36 for engaging seat 32 to form a fluid seal therewith. The spring 34 engages at one end the under surface of holder 35 and at its other end the interior face of base 37 of portion 17. A discharge port 38 in base 37 communicates with bore 28 and any discharge therefrom will flow into space 5 from whence the discharge may be ejected to atmosphere through any suitable means such as the port 11 shown in Figure 1, although preferably port 11 should be positioned to communicate with the bottom of space 5.

The cylindrical cup portion 21 forms with inner portion 15 and the top of portion 18 an annular space 39 and ports 40 are provided in body 15 forming a means of fluid communication between the space 39 and a cylindrical bore 42. At one end cylindrical bore 42 terminates at depending part 32 through which extends an opening 43 and it can be appreciated that once the relief valve is unseated, fluid from within bore 42 will pass to discharge port 38 through various bores including the spaces 44 formed by the hexagonal disc holder 35 with the wall of bore 27, it being understood that the disc holder 35 may assume other configurations such as that of a triangle or rectangle and that its movement within bore 28 is positively limited by part 32 and shoulder 29. Bore 42 terminates at its other end in an enlarged bore 45, the bores forming an annular flange 46. Secured to the annular flange 31 by, for example, a plurality of screws 47 is a flexible diaphragm 48 and a diaphragm ring 49. A piston 50 of any suitable material such as nylon is designed for movement within the cylinder formed by bore 42 between the solid and dotted line positions shown in Figure 3 and this piston is secured to the diaphragm 48 by means of the washer 51 and suitable means 52. The downward movement of the piston is limited by an annular shoulder 53 forming a part thereof contacting the flange 46. For convenience hereinafter and referring to Figure 3 wherein the normal position (or position under static load) of piston 50 is shown, that part of bore 42 beneath the piston will be identified as chamber 41 and that part of bore 45 beneath diaphragm 48 will be identified as chamber 55, it being noted that a bleed hole 54 is provided for fluid communication between chamber 55 and space 39.

In considering the operation of the apparatus, the air bag proper will be defined as the main space therein plus chamber 39 and that portion of bore 45 above diaphragm 48. At static load, the pressure within chamber 55 is equalized or balanced with the air pressure on diaphragm 48 due to bleeder 54 allowing air to pass from space 39 into chamber 55. The size of bleeder 54 is quite critical, and if desired could be made adjustable by the incorporation of well known valve means and as depicted is of a size to prevent the diaphragm 48 from moving downwardly unless there is a sudden or instantaneous impact thereon as a result of a large pressure change within bag 10. Assuming diaphragm 48 and in turn piston 50 is forced downwardly from the position shown in Figure 3, then of course it will return to normal position as soon as bleeder 54 permits balancing of pressures beneath and above the diaphragm. A downward force on piston 50 causing it to travel its maximum stroke or at least to close the ports 40, applies pressure to the medium within chamber 41 and due to the relative areas of circular diaphragm 48 and piston P within chamber 41, this pressure within chamber 41 wil greatly exceed the pressure within the air bag proper. For example, an instantaneous pressure on diaphragm 48 of 200 p.s.i. will cause the piston P to move to the end of its stroke which would be when shoulder 53 strikes flange 46 and could result in the medium within chamber 41 being under a pressure of about 270 p.s.i. It will be again noted that piston 50 closes ports 40 with respect to chamber 41 during its downward stroke, but this is only momentary due to bleeder 54. The load of spring 34, which is also fairly critical and thus could be designed so that it could be adjusted, is set so that with air only in chamber 41 and the piston in its lower limit, the maximum extreme pressure resulting from air compression will not lift disc 36 off of its seat 32 and thus there would be no discharge through port 38. However, any greater pressure in chamber 41 will open the relief valve R and thus any liquid with air in chamber 41 will result in sufficient pressure, when the piston 50 is approaching the end of its downward stroke to open valve R. This is so because water will have displaced part of the air volume in chamber 41, thus causing the air to be compressed to a greater pressure. Since water is incompressible, it will be discharged into the atmosphere through passages 44 and ports 38 and 11 until the pressure reaches a value just less than that for which the relief valve was set, at which point valve R closes.

Piston 50 is operated by a momentary differential pressure across diaphragm 48 as a result of a sudden increase or decrease in air bag pressure. A sudden increase in air bag pressure will cause momentary differential pressure across the diaphragm 48 which will move piston 50 down, closing ports 40 and compressing the air that is trapped in chamber 41. Conversely, any sudden decrease in air bag pressure will cause the piston 50 to move upwardly, thus resulting in a momentary decrease in pressure in chamber 41. If the impacts are frequent, instantaneous and of a sufficient size, the diaphragm 48 and piston 50 will have a dynamic action.

Assuming water has accumulated in bag 10, it will pass directly into space 39 through ports 40 into water expulsion chamber 41 or else it will be so jostled or splashed around within bag 10 due to vibrations thereof that it will eventually be collected within chamber 41 and discharged in the manner described but only when ports 40 are closed. It should be mentioned that water within chamber 41 will settle to the bottom thereof and then during discharge there should be no loss of air from chamber 41 unless there is unexpected jostling around of water within chamber 41, but in any event since ports 40 are closed during expulsion, the loss of air pressure within the bag as a result of liquid discharge would be, for all practical purposes, non-existent. In addition to primarily functioning as a continual and automatic water expulsion assembly, valve assembly V also functions to dry air within bag 10. This action results when the bag expands, such as when the internal pressure therein decreases to 60 p.s.i., to move piston P upwardly or in other words during the return stroke of the dynamic action. When this happens, air within chamber 41 expands and passes through ports 40 to reduced pressure area 39, and this expansion through ports 40 causes the air to chill immediately and condense the moisture contained therein in the form of droplets at the mouth of the ports. Therefore, ports 40 function as expansion valves and the liquid accumulating thereat eventually enters and is expelled from chamber 41. Since the vibrations of the air bag and the dynamic action of piston P cause circulation of air within bag 10 through ports 40, there thus is provded means for condensing moisture from the air and therefore drying the air. This is a positive action, although it is realized that the removal of the water generally necessarily dries the air.

The following is an example of operation of the system of Figure 1 with the static load bag air pressure at 90 p.s.i., and the effective diaphragm 48 and piston areas being .4240 and .1726 square inches respectively. The relief valve R is set to pop open with any pressure above 275 p.s.i. in chamber 41. A sudden maximum increase of pressure in the air bag 10 from 90 to 200 p.s.i. will cause a momentary differential pressure of 110 p.s.i. (200–90) on the diaphragm 48, resulting in a force of 46.6 lbs. (110×.424) tending to move the diaphragm 48 and piston 50 downwardly. The initial volume in chamber 41 before the piston 50 moves down is .1240 cubic inch and the pressure in this chamber is the same as that in the air bag 10, namely 200 p.s.i. The force on the bottom of piston 50 is 34.5 lbs. (200×.1726) so that the piston 50 will move down, due to the greater force on the top of the diaphragm 48. The piston 50 now moves down, closing ports 40, to the end of its stroke reducing the volume in chamber 41 to .0915 cubic inch. With air only trapped in chamber 41, this reduction in volume causes an increase in pressure to 271 p.s.i.

$$\frac{(200 \times .1240)}{.0915}$$

Since the relief valve R is set for 275 p.s.i. there will be no discharge of air. However, as an example, let .04 cubic inch of water be in chamber 41 with air. The initial volume for the air with the piston 50 at the top of its stroke has been reduced to .0840 cubic inch (.1240−.04)

and the final volume for air has also been reduced to .0515 cubic inch (.0915−.04) since water is incompressible. Therefore, the final pressure of the air in chamber 41 with the piston 50 at the bottom of its stroke would be 326 p.s.i.

$$\frac{(200 \times .084)}{.0515}$$

which is greater than that for which the relief valve has been set, namely 275 p.s.i. Consequently, the relief valve has opened and water is discharged past the valve disc holder 35 into discharge port 38 and out into the atmosphere through port 11 until the volume for the compressed air in chamber 41 has increased to a point where the resultant pressure is less than 275 p.s.i., at which time the relief valve R will close leaving the air still trapped in chamber 41 with no loss of air from inside of the air bag 10.

From the foregoing description it will be apparent that I have invented a pneumatic suspension system having incorporated therein a novel liquid expulsion valve assembly that achieves the objects enumerated. Although the valve unit V is shown as having a special use, its principles may be utilized for other purposes and in other combinations, as mentioned briefly. Thus, being aware of possible modifications and uses, I desire it to be understood that the scope of the invention is not to be limited except in accordance wth the terms of the appended claims and equivalents thereof.

What is claimed is:

1. A pneumatic suspension system for supporting a load exposed to varying shocks and impacts comprising a flexible bag containing a volume of compressed air at a desired pressure under static load but which pressure will vary in accordance with the impacts and shocks, expulsion valve assembly means incorporated in the bag for automatically and selectively removing to the exclusion of air any liquid that accumulates within the bag, said assembly having a liquid collecting chamber disposed beneath the bag normally in fluid communication with the bag whereby air and any liquid within the bag will flow into said chamber, and said assembly means being operable only upon liquid being present in the chamber to discharge liquid from said chamber and to close the fluid communication between the bag and chamber during discharge of liquid from said chamber.

2. A pneumatic suspension system as defined in claim 1 wherein the assembly includes relief valve means, one end of the chamber being normally sealed against liquid discharge by said relief valve means being biased thereagainst, said last named means being arranged to open said seal upon there being a predetermined fluid pressure within the chamber to overcome said bias, and a piston operable within the chamber for causing fluid pressure variations in said chamber during its stroke within the chamber in accordance with impacts on said system.

3. A pneumatic suspension system as defined in claim 2 wherein the means operable for closing the fluid communication between the bag and chamber consists of a piston operable within the chamber in accordance with impacts on said system and the means for discharging comprises the piston providing sufficient force on the fluid in the chamber to overcome the bias of said relief valve means.

4. A pneumatic suspension system as defined in claim 3 wherein the piston is operable by a diaphragm directly exposed on one side thereof to air pressure variations within the bag.

5. A pneumatic suspension system as defined in claim 4 wherein an air port communicates with the other side of said diaphragm to balance air pressures above and beneath the diaphragm, said port being of a size whereby only instantaneous impacts to the system will result in momentary pressure differentials across the diaphragm to cause movement of said piston within the chamber.

6. A pneumatic suspension system as defined in claim 5 wherein the relative areas of the diaphragm and piston are such that the force created by the piston within the chamber will exceed the force on the diaphragm caused by increased air pressures within the bag.

7. A subcombination in a pneumatic suspension system including an air chamber, comprising a liquid expulsion valve body having a cylinder adapted to be disposed beneath the air chamber for receiving from the chamber air and any liquid, means in said body adapted to normally provide fluid communication between the chamber and cylinder, a piston disposed within the cylinder for limited reciprocating movement to cause compression and pressure variations of the air normally received within the cylinder, a relief valve disposed to cooperate with the cylinder adjacent the lower end thereof such that any liquid in the cylinder may accumulate against the relief valve, said relief valve being operable independently of said piston and only upon there being a fluid pressure in the cylinder of a predetermined amount, said relief valve being set to open at a pressure exceeding the maximum pressure that can be exerted thereon by compressed air alone in said cylinder whereby the relief valve is operable to prevent any discharge from said cylinder unless there is a volume of liquid therein.

8. A subcombination as defined in claim 7 wherein the piston is adapted to close the fluid communication between the chamber and cylinder whenever the relief valve is opened.

9. A subcombination as defined in claim 7 wherein the piston is operable by a diaphragm adapted to be exposed on one side thereof to air pressure variations within the chamber.

10. A subcombination as defined in claim 9 wherein an air port communicates with the other side of said diaphragm to balance air pressures above and beneath the diaphragm, said port being of a size whereby only sudden pressure changes in the air within the chamber are adapted to result in momentary pressure differentials across the diaphragm to cause movement of said piston within the cylinder.

11. A subcombination as defined in claim 10 wherein the relative areas of the diaphragm and piston are such that the force created by the piston within the cylinder is adapted to exceed the force on the diaphragm caused by increased air pressures within the chamber.

12. A combination including a fluid chamber containing a volume of compressed air exposed to pressure variations, and a liquid expulsion valve unit operably interconnected with the chamber for automatically removing any liquid that accumulates within the chamber to the exclusion of air, said valve unit including a cylinder normally in fluid communication with said chamber for normally receiving air and any liquid from said chamber, and said valve unit being operable to remove from the cylinder liquid only upon the fluid received by said valve unit being at a pressure exceeding the maximum pressure that can be exerted by air alone in said unit.

13. The combination as defined in claim 12 wherein there is provided a piston disposed within the cylinder for limited reciprocating movement and a relief valve disposed to cooperate with the cylinder adjacent the lower end thereof such that any liquid in the cylinder may accumulate against the relief valve, said relief valve being operable independently of said piston and only upon there being a fluid pressure in the cylinder of a predetermined amount, said relief valve being set to open at a pressure exceeding the maximum pressure that can be exerted thereon by compressed air alone in said cylinder whereby the relief valve is operable to prevent any discharge from said cylinder unless there is a volume of liquid therein.

14. A valve unit comprising a cylinder normally containing a compressible fluid, a piston disposed within said cylinder for limited reciprocating movement, a relief valve disposed to cooperate with the cylinder adjacent the lower end thereof, said relief valve being operable independently of said piston and only upon there being a fluid pressure in the cylinder of a predetermined amount said relief valve being set to open at a pressure exceeding the maximum pressure that can be exerted by the compressible fluid compressed in said cylinder by said piston, and means for introducing while said relief valve is closed a non-compressible fluid into said cylinder whereby the space in said cylinder for the compressible fluid is reduced and the compressible fluid when compressed will exceed a pressure at which the relief valve opens.

15. A valve unit as defined in claim 14 wherein there is provided a diaphragm operably connected with said piston for causing reciprocating movement of said piston and wherein there is provided means associated with said diaphragm for causing the piston to apply only momentary pressure changes to the compressible fluid.

References Cited in the file of this patent

UNITED STATES PATENTS

| | | |
|---|---|---|
| 862,867 | Eggleston | Aug. 6, 1907 |
| 1,278,118 | Demarest | Sept. 10, 1918 |
| 2,069,645 | Cardew | Feb. 2, 1937 |
| 2,488,288 | Gouirand | Nov. 15, 1949 |
| 2,596,031 | Kaufman | May 6, 1952 |
| 2,742,301 | Pointer | Apr. 17, 1956 |
| 2,845,081 | George | July 29, 1958 |